No. 741,176. PATENTED OCT. 13, 1903.
J. J. SLAVIN.
INDICATOR.
APPLICATION FILED OCT. 10, 1902.
NO MODEL. 3 SHEETS—SHEET 1.
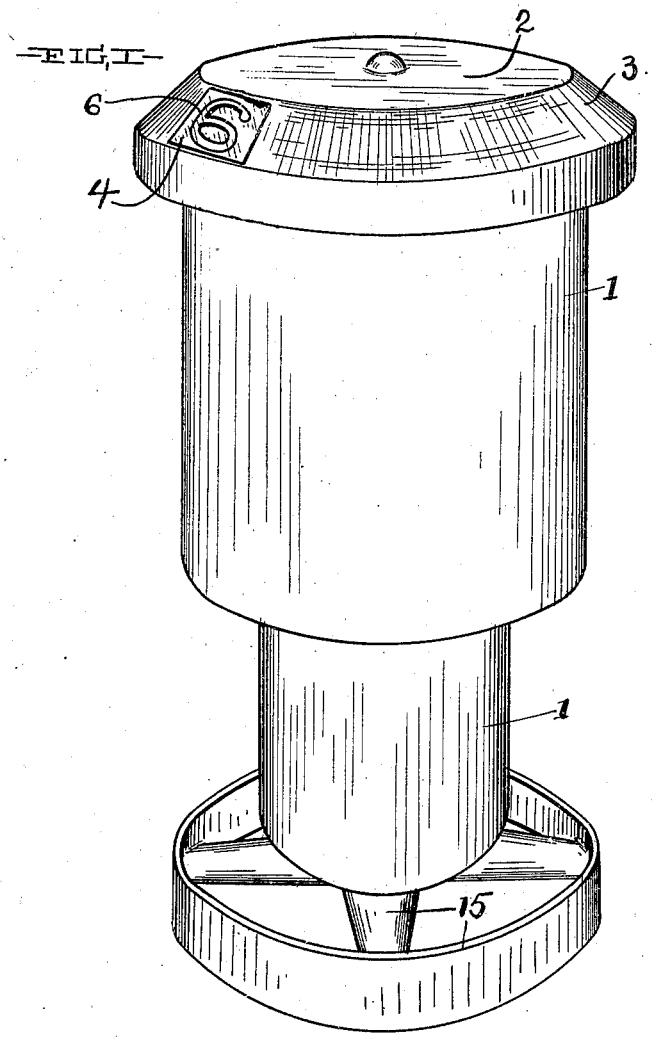

No. 741,176. PATENTED OCT. 13, 1903.
J. J. SLAVIN.
INDICATOR.
APPLICATION FILED OCT. 10, 1902.
NO MODEL. 3 SHEETS—SHEET 2.
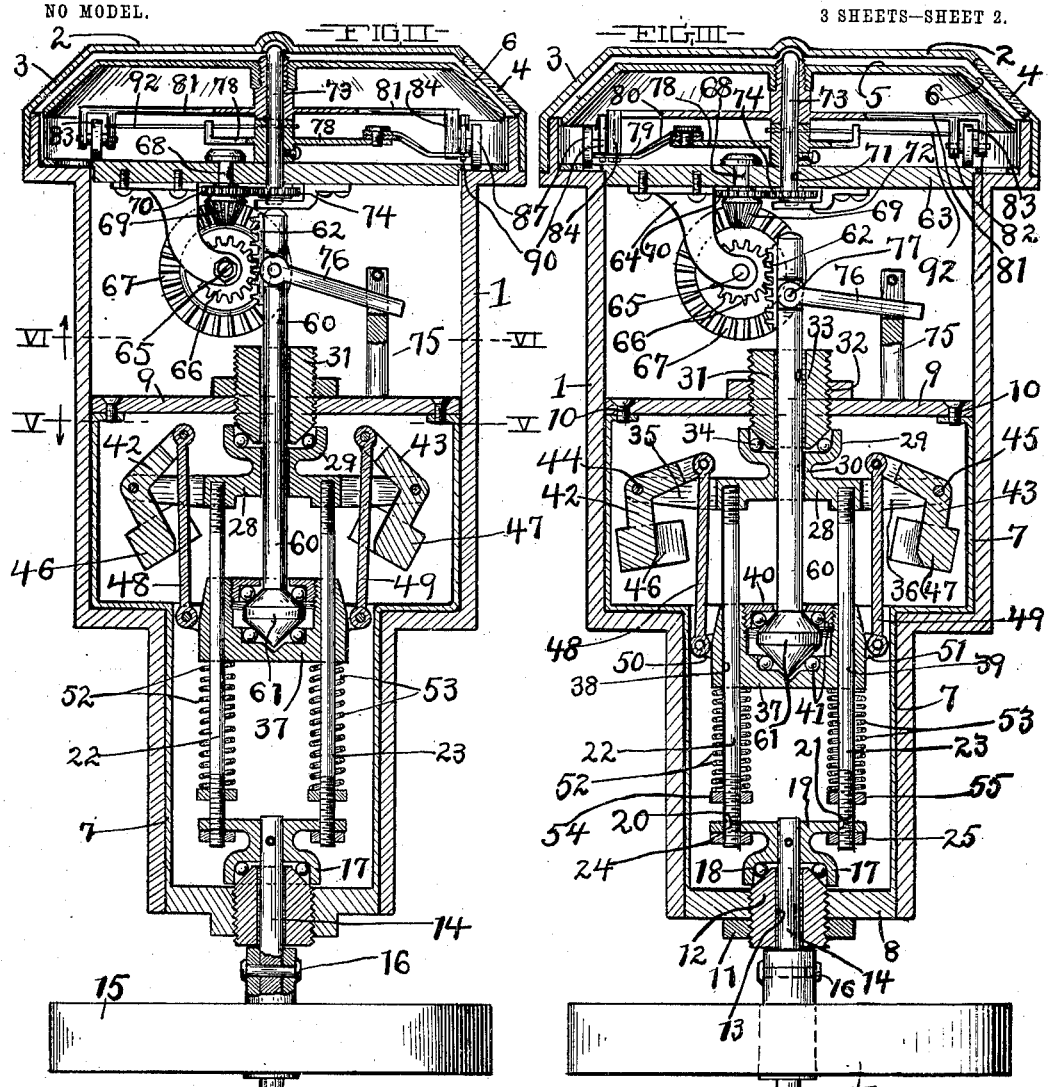
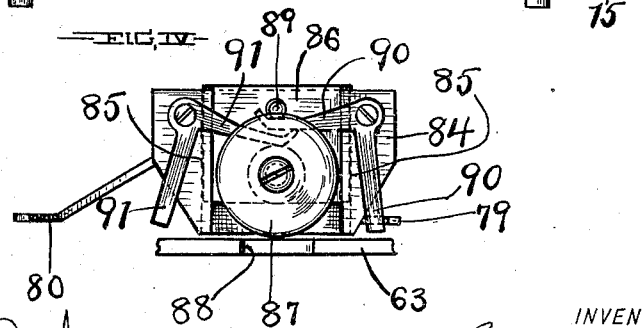
WITNESSES:
Daniel E Daly.
Victor C Lynch.
INVENTOR
James J. Slavin
BY Lynch & Orer
his ATTORNEYS.

No. 741,176. PATENTED OCT. 13, 1903.
J. J. SLAVIN.
INDICATOR.
APPLICATION FILED OCT. 10, 1902.
NO MODEL. 3 SHEETS—SHEET 3.
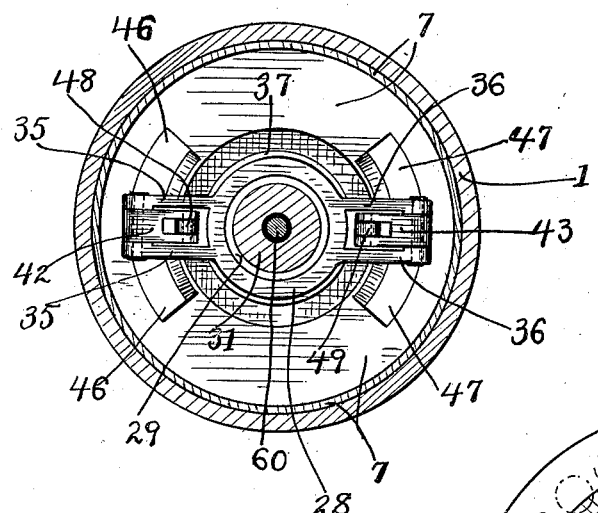
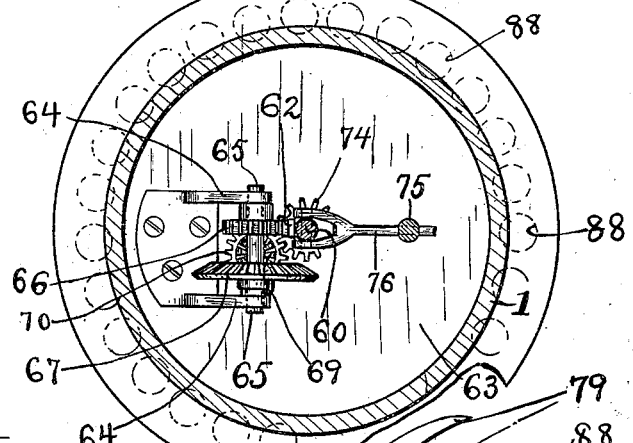
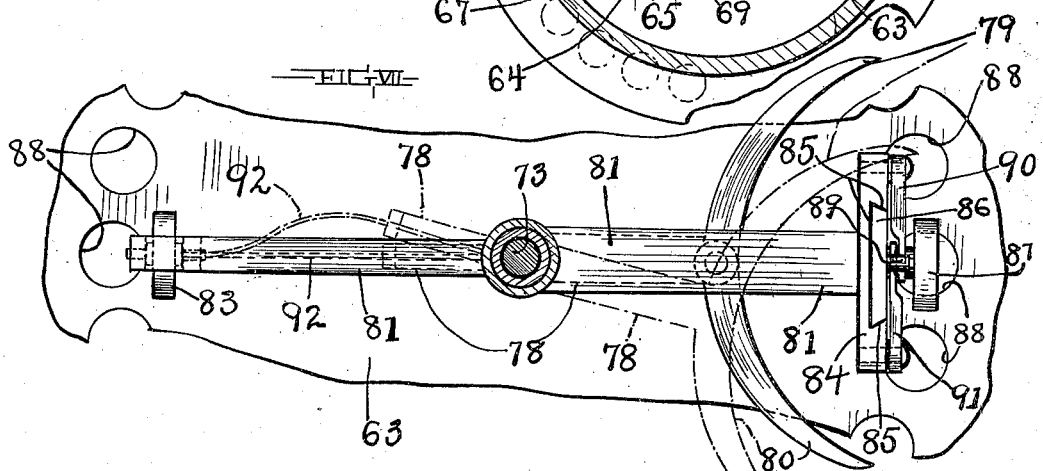
WITNESSES:
Daniel E. Daly.
Victor C. Lynch.
INVENTOR
James J. Slavin
BY Lynch & Dover
his ATTORNEYS.

No. 741,176. Patented October 13, 1903.

UNITED STATES PATENT OFFICE.

JAMES J. SLAVIN, OF CLEVELAND, OHIO.

INDICATOR.

SPECIFICATION forming part of Letters Patent No. 741,176, dated October 13, 1903.

Application filed October 10, 1902. Serial No. 126,755. (No model.)

*To all whom it may concern:*

Be it known that I, JAMES J. SLAVIN, a citizen of the United States of America, residing at Cleveland, in the county of Cuyahoga and State of Ohio, have invented certain new and useful Improvements in Indicators; and I hereby declare the following to be a full, clear, and exact description of the invention, such as will enable others skilled in the art to which it pertains to make and use the same.

This invention relates to indicating devices, and particularly to the class of indicators used to display or indicate the speed of a moving vehicle.

The object of the invention is to provide a device of this character which will indicate a unit of velocity or degree of movement or any multiple of that unit, but which will not indicate fractional parts of the unit, the indicating mechanism remaining stationary until the machine to which the indicator is attached acquires or loses a unit of velocity, thus entirely doing away with the confusing flickering or vacillating movement of the indicator occasioned by the recording or indicating of slight and unimportant changes in the velocity of the machine.

A further object of the invention is to provide an indicator having its parts so mounted and arranged as to minimize the amount of friction between the moving parts thereof, securing thereby great accuracy in the operation of the device.

My invention therefore consists in providing indicating mechanism, means for communicating the movement of the machine to the indicating mechanism, and means for restraining the movement of the indicating mechanism during certain predetermined periods of increase or decrease in the velocity of the machine.

My invention also consists in the features of construction and combination of parts, as illustrated in the accompanying drawings, hereinafter described in the specification, and pointed out in the claims.

In the accompanying drawings, Figure I is a perspective view of my indicator. Fig. II is a central vertical section. Fig. III is a similar section with the mechanism in a different position. Fig. IV is a detail view, in end elevation, of the device which holds the indicating mechanism stationary while the mechanism that actuates it is moving through a predetermined period of revolution. Fig. V is a section on lines V V, Fig. II. Fig. VI is a section on lines VI VI, Fig. II. Fig. VII is an enlarged detail plan view of the indicating mechanism with the dial removed.

Again referring to the drawings, 1 represents the outer case of my indicator. This case is preferably cylindrical in form and for the sake of lightness is somewhat reduced in diameter near its lower end. The case 1 is open at its top and bottom, and the top is closed by means of a removable cover 2, the side of which is beveled, as at 3. The bevel side or face 3 is provided with an opening or window 4. The window 4 is preferably glazed, so as to keep dust from entering the interior of the case. Within the cover 2 is mounted a dial-plate 5 in the manner hereinafter described. The dial-plate 5 conforms to the interior of the cover and has a bevel-face 6, on which are arranged the indicating characters. These characters are arranged so that when the dial is rotated one of the characters will appear through the opening or window 3 in the cover 2. In general use the indicator will be mounted vertically and somewhat below the line of vision of the party inspecting the same, and therefore the slight inclination of the character-carrying face 6 of the dial will allow the same to be seen and read quite easily.

Within the case 1 is mounted a frame 7, which closely conforms to the interior of the case 1. The frame 7 is closed at its bottom by an annular plate 8, preferably formed integral with the said frame, and over the top is arranged an annular plate 9, which is removably secured thereto by means of screws 10. In the plate 8 is secured a screw-threaded cone 12, which is provided with a vertical bore 13, through which is passed a shaft 14, so as to project a short distance within the frame 7. On the outer end of the shaft 14 is rigidly secured a drum 15 by means of a bolt 16. On the inner end of the shaft 14 is rigidly secured an inverted cup 17, which incloses the upper portion of the cone 12. Between the cone 12 and the cup 17 are arranged a suitable number of ball-bearings 18. On the inner end of the shaft 14 is rigidly secured a plate 19, which is preferably formed integral with the cup 17. In the plate 19 are formed two screw-threaded holes 20 and 21. Two vertical rods 22 and 23, screw-threaded at their respective ends, are secured at their lower ends in the holes 20 and 21 in the plate 19 and are preferably locked therein by means of nuts 24 and 25. The upper end of the rods 22 and 23 are secured in a plate 28. On top of the plate 28 and preferably formed integral therewith is formed a cup 29. A central vertical bore 30 extends through the plate 28 and the cup 29. A cone 31 is mounted in a screw-threaded vertical bore 32, formed in the plate 9, so as to extend down and be adjustable within the cup 29. The cone 31 has a central vertical bore 33. Between the cone 31 and the interior of the cup 29 are arranged ball-bearings 34. Forked arms 35 and 36, which are preferably formed integral with the plate 28, extend horizontally from opposite sides thereof. On the rods 22 and 23 is mounted a receptacle or box 37, provided with vertical bores 38 and 39, which allow it to slide vertically on the said rod 22 and 23. The receptacle or box 37 is provided with a screw-threaded cap 40. The sliding box 37 forms a journal-box for the end of the vertical shaft 60, which is provided with an enlarged bulb-shaped end 61, which rests upon suitably-arranged ball-bearings 41 within the sliding box 37.

In each of the forked arms 35 and 36, which project horizontally from the plate 28, is pivotally mounted a bell-crank lever 42 and 43, respectively, by means of horizontally-disposed pivot-pins 44 and 45, respectively. On the lower end of each of the bell-crank levers 42 and 43 is secured a weight 46 and 47, respectively. These weights are preferably semicircular in shape, so as to conform to the interior of the frame 7. To the upper end of each of the bell-crank levers 42 and 43 is pivotally secured or hinged a link 48 and 49, respectively. The lower ends of these links 48 and 49 are pivotally secured to ears 50 and 51, respectively, arranged on opposite sides of the sliding box 37. On the vertical rods 22 and 23 below the sliding box 37 are mounted spiral springs 52 and 53, respectively. These spiral springs rest upon nuts 54 and 55, respectively, which engage the screw-threads on the lower end of the respective rods 22 and 23. By moving the nuts 54 and 55 up or down on the rods 22 and 23 the tension or pressure of the springs 52 and 53 against the sliding box 37 can be increased or decreased, thereby adding to or lessening the resistance which must be overcome in moving the sliding box 37 downwardly on the rods 22 and 23, and the nuts 54 and 55 therefore constitute the means for the general adjustment of the indicating mechanism.

The shaft 60 extends up through the bore 30 in the plate 28 and cup 29 and the bore 33 in the cone 31 to within a short distance from the top of the case 1, and on the upper end of the shaft 60 is secured a rack 62. In the case 1 above the upper end of the shaft 60 is mounted an annular plate 63. On the bottom of this plate 63 is secured a bracket 64, in which are formed bearings for a horizontal shaft 65. On the shaft 65 is rigidly mounted a small gear 66 and a bevel-faced gear 67. The gear 66 is arranged to mesh with the rack 62 on the end of the shaft 60. A pin 68 is journaled vertically in the plate 63, so as to extend down below the bottom or under side of said plate. On the end of this pin 68 is rigidly secured a bevel-faced gear 69, which meshes with the bevel-faced gear 67 on the shaft 65. On the pin 68 above the bevel-gear 69 is rigidly secured a gear-wheel 70. The plate 63 has a central bore 71, and directly below it is arranged an arm or bracket 72, which is rigidly secured to the said plate 63. This bracket 72 forms a bearing for the lower end of a vertical shaft 73, which extends up through the bore 71 in the plate 63. On the lower end of the shaft 73 between the under side of the plate 63 and the bracket 72 is rigidly secured a gear-wheel 74, arranged to mesh with the gear-wheel 70 on the pin 68. On the plate 9 is mounted a slotted standard 75. To the shaft 60 is secured an arm 76 by means of a pin 77, and the free end of the arm 76 extends into the slot in the slotted standard 75. This arrangement prevents any rotary movement of the shaft 60, while leaving it free to move vertically. On the shaft 73 above the plate 63 is pinned an arm 78. On one end of the arm 78 are secured two divergent fingers or prongs 79 and 80, Fig. 7. These prongs are arranged so that the space between their ends may be increased or diminished, as desired. On the shaft 73 above the arm 78 is loosely journaled an arm 81. On one end of the arm 81 are arranged fixed bearings 82 for a roller 83, which is arranged to come in contact with and travel on the upper surface of the plate 63. On the opposite end of the arm 81 is mounted a small carriage 84. In this carriage 84 is formed a guideway 85, and in the guideway 85 is arranged a plate 86, Fig. 4, so as to be capable of moving vertically therein. On the plate 86 is journaled a roller 87. In the plate 63, in the path of the roller 87, are formed a series of depressions or holes 88, which are so arranged that the roller 87 will enter therein. When the roller 87 settles in one of the depressions 88, it will remain therein and prevent any movement of the arm 81 until it has been lifted out of the said depression by the coöperating mechanism hereinafter described. On the plate 86 is formed a projecting lug 89. On the front of the carriage 84, at each side of the plate 86, is pivotally mounted a bell-crank lever 90 and 91, respectively. One arm of each bell-crank lever extends horizontally across the face of the plate 86 under the lug 89, and the other arm extends down at the side of the roller 87. When either of the downwardly-extending arms of the respective bell-crank levers 90 and 91 are pressed in toward the roller 87, the horizontal arm of the lever acted upon will move up, lifting the plate 86 in the carriage 84, and consequently lifting the roller 87 out of the depression 88 in which it has settled. The arm 81 is operatively connected to the arm 78 by a fine resilient wire 92, which tends to normally hold the arm 81 in the same vertical plane with the arm 78, but which is not strong enough to move the arm 81 when the roller 87 is in a depression. To the arm 81 is rigidly secured the aforementioned dial-plate 5, so that when the roller 87 is in a depression 88 in the plate 63 one of the indicating characters on the said dial will appear in the center of the opening or window 4 in the cover 2, and each of the said indicating characters on the said dial will be directly over one of the said depressions 88 in the said plate 63.

The operation of this device will be readily understood. The drum 15 is coupled in any convenient manner to the revolving or rotating body the speed of which is to be indicated. The drum 15 rotates the shaft 14, which in turn revolves the plate 28, which is operatively connected with the shaft 14 by the rods 22 and 23. As the plate 28 revolves the weights 46 and 47 on the respective bell-crank levers 42 and 43 move out, causing the upper ends of the bell-crank levers to move in and down, thereby shoving down the links 48 and 49, which in turn push down the box 37 on the rod 22 and 23 against the pressure of the springs 52 and 53. Of course the faster the plate 28 revolves the farther out the weights 46 and 4 will move and the farther down the box 37 will move on the rods 22 and 23. As the movement of the plate 28 lessens or ceases the weights 46 and 47 will swing down, and springs 52 and 53 will move the box up on the rods 22 and 23 to its normal position. Therefore if the speed of the revolving body is variable the box 37 will be constantly moving up and down on the said rods 22 and 23. As the box 37 moves up and down it imparts a corresponding movement to the shaft 60, which is journaled therein. As the shaft 60 moves up and down it actuates the gear 66 through the medium of the rack 62 in either a backward or forward direction. As the gear 66 is rigid on the shaft 65 it carries around with it the bevel-faced gear 67, which is also rigid on the shaft 65. The bevel-faced gear 67 actuates the bevel-faced gear 69, secured on the pin 68, rotating the pin 68 and the gear-wheel 70, which is rigidly secured thereon. The gear-wheel 70 in turn actuates the gear-wheel 74, which is keyed on the shaft 73, thereby rotating the shaft 73. Now when the indicating mechanism is at rest the arms 78 and 81 will be in the same vertical plane, and the arm 78 will be in line with one of the depressions 88, and the roller 87 on the end of the arm 81 will be in a depression 88, and the arm 78 will be in line with the same depression, and a character on the dial representing a unit of speed or a multiple of that unit will be visible in the center of the window in the cover 2. When the indicating mechanism is actuated, the arm 78 will be carried around, and as it moves it will have a tendency to carry around with it the arm 81, to which it is operatively connected by the resilient wire 92; but when the roller 87 is in a depression 88 the spring 92 is not strong enough to move the arm 81, and therefore the arm 78 will assume or stand at an angle to the arm 81. When the arm 78 has moved a sufficient distance to bring it in line with the depression next to the depression in which the roller 87 is fixed, then the prong 79 on the end of the arm 78 will come in contact with the bell-crank lever 90 and lift the plate 86 in the carriage 85 on the end of the arm 81, thereby raising the roller 87 out of the depression in which it is standing, and the spring 92 will cause the arm 81 to move into the vertical plane of the arm 78, and the roller 87 will settle into the depression toward which the arm 78 is then pointed, and the character on the dial indicating the next higher multiple of the unit of speed will appear in the center of the window 4. When the actuating mechanism is caused to move in the opposite direction through the slowing down of the moving body, the arm 78 will move back toward the depression next below the one in which the roller is standing, and when the said arm 78 comes in line with the said depressions the finger 80 will come in contact with the bell-crank lever 91, and the roller 87 will again be lifted from the depression in which it is fixed, and the arm 81 acting under the tension of the spring 92 will move back in line with the arm 78, and the roller 87 will settle into the depression toward which the arm 78 is pointing, and the character on the dial indicating the next lower multiple of the unit of speed will appear through the window 4 in the cover 2.

My invention can be embodied in various forms, and I therefore do not desire to be limited to any particular construction. Especially is this true of the locking device, which holds the arm 81 stationary, as any sort of a catch may be substituted for the roller and any device may be arranged on the plate 63 to engage with the said catch.

What I claim is—

1. In a speed-indicator, the combination of a normally stationary indicating device, continuously-moving mechanism for transmitting the motion of the machine to said indicating device, and means for communicating the movement of the said mechanism to the said indicating device only during certain predetermined periods of increase or decrease in the velocity of the machine to which the indicator is attached.

2. In a speed-indicator the combination of an indicating device, mechanism adapted to be operated by the movement of the machine to which the indicator is attached, means for operatively connecting said mechanism with the indicating device so that the said mechanism can actuate said indicating device and a locking device for holding the said indicating device stationary and adapted to yield when the said mechanism exerts a predetermined pressure on the said indicating device.

3. In a speed-indicator, the combination of an indicating device, mechanism for transmitting the motion of the machine to said indicating device, and means for locking the movement of the indicating device during certain predetermined periods of increase or decrease in the velocity of the machine to which the indicator is attached.

4. In a speed-indicator, the combination of an indicating device, mechanism for transmitting the motion of the machine to said indicating device, means for locking said indicating device at certain predetermined points while the mechanism for transmitting the motion of the machine continues to travel, and means for releasing said locking means.

5. In a speed-indicator the combination of a casing, a dial rotatably mounted in said casing, mechanism arranged in said casing for rotating said dial backward or forward according to the increase or decrease in the velocity of the machine to which the indicator is attached, and means for holding the said dial stationary at predetermined points during the increase or decrease in the velocity of the said machine.

6. In a speed-indicator, the combination of an indicating device, continuously-moving mechanism for transmitting the motion of the machine to the indicating device, a yielding connection operatively coupling said indicating device with the said mechanism, means for locking the said indicating device so that it will remain stationary while the machine to which the indicator is attached is moving within a predetermined limit of change of speed, and means for releasing the locking device when the change of speed of the machine exceeds the said limit.

7. In a speed-indicator, the combination of an indicating device, mechanism for transmitting the motion of the machine to said indicating device, a resilient connection operatively coupling the indicating device with the said mechanism so that the movement of the said mechanism can cause a movement of said indicating device and a locking device arranged to yield under a predetermined pressure and adapted to hold the said indicating device stationary until the tension on the said resilient connection produced by the movement of the said mechanism shall be sufficient to disengage the said indicating mechanism from the said locking device.

8. In a speed-indicator, a casing, vertical rods rotatably mounted in said casing, a sliding journal-box mounted on said rods, means for causing said journal-box to move up and down on said rods according to the increase or decrease of the speed of the machine to which the indicator is attached, a vertical shaft having its lower end journaled in said box, means for preventing the rotation of the said vertical shaft, a rack formed on the upper end of said vertical shaft, a vertical shaft arranged above the first-mentioned shaft, a gear arranged on the said last-mentioned shaft, a train of gear-wheels operatively connecting the wheel on the last-mentioned shaft with the rack on the first-mentioned shaft, an arm keyed to last-mentioned shaft, an arm loosely journaled on said last-mentioned shaft, means for forming a yielding connection between the said arms and means for holding the loosely-journaled arm stationary while the arm keyed to the last-mentioned shaft continues to travel, substantially as described and for the purpose set forth.

9. In a speed-indicator, a casing, vertical rods rotatably mounted in said casing, a sliding journal-box mounted on said rods, means for causing said journal-box to move up and down on said rods, according to the increase or decrease of the speed of the machine to which the indicator is attached, a vertical shaft with its lower end journaled in said box, a rack formed on the upper end of the said vertical shaft, a vertical shaft arranged above the first-mentioned shaft, means for operatively connecting the first-mentioned shaft with the last-mentioned shaft, so that the vertical movement of the first-mentioned shaft will cause a rotary movement of the last-mentioned shaft, an arm keyed on the last-mentioned shaft, an arm loosely journaled on the last-mentioned shaft, and a spring operatively connecting the said arms.

10. In a speed-indicator, a casing, vertical rods rotatably mounted in said casing, a sliding journal-box mounted on said rods, means for causing said journal-box to move up and down on said rods, according to the increase or decrease of the speed of the machine to which the indicator is attached, a vertical shaft with its lower end journaled in said box, a rack formed on the upper end of the said vertical shaft, a vertical shaft arranged above the first-mentioned shaft, means for operatively connecting the first-mentioned shaft with the last-mentioned shaft, so that the vertical movement of the first-mentioned shaft will cause a rotary movement of the last-mentioned shaft, an arm keyed on the last-mentioned shaft, an arm loosely journaled on the last-mentioned shaft, a spring operatively connecting the said arms, means for restraining the movement of the last-mentioned arm while the first-mentioned arm continues to travel, a dial mounted on said last-mentioned arm, and a cover arranged on the top of said casing and provided with an opening for inspecting the said dial, substantially as described and for the purpose set forth.

11. In a speed-indicator, a casing, vertical rods mounted in said casing, a sliding journal-box mounted on said rods, bell-crank levers supported at the upper end of said rods, weights secured to the lower ends of said bell-crank levers, links connecting the upper end of the said bell-crank levers with the said sliding journal-box, a vertical shaft with its lower end journaled in said journal-box, a horizontal plate arranged in said casing above said vertical shaft, a vertical shaft journaled in said plate, means for operatively connecting the first-mentioned shaft with the last-mentioned shaft so that the vertical movement of the first-mentioned shaft will cause a rotary movement of the last-mentioned shaft, an arm keyed to said last-mentioned shaft, an arm loosely journaled on the last-mentioned shaft, a spring operatively connecting said arms, depressions formed in said horizontal plate, a roller supported so as to slide vertically on the end of the loosely-journaled arm and arranged to enter the depressions in said plate, and means carried by the first-mentioned arm and arranged to come in contact with and raise the said roller from the said depressions, substantially as described.

12. In a speed-indicator, a casing, a vertical shaft mounted within said casing, means for imparting vertical movement to said shaft, a horizontal plate arranged above said vertical shaft, an annular series of stops formed in said plate, a vertical shaft journaled in said plate, means for operatively connecting the first-mentioned shaft with the last-mentioned shaft, so that the vertical movement of the first-mentioned shaft will cause a rotary movement of the last-mentioned shaft, an arm keyed to the last-mentioned shaft, an arm loosely journaled on the last-mentioned shaft, a spring operatively connecting said arms, a catch supported on the end of the loosely-journaled arm and arranged to come in contact with the stops on the said plate, means for lifting the said catch out of contact with the said stops, and a finger secured to the first-mentioned arm and arranged to come in contact with and actuate the means for lifting the said catch, substantially as described.

13. In a speed-indicating device, a case, a horizontal plate arranged in said case, an annular series of depressions formed in said plate, a shaft journaled in said plate, means arranged within said case for imparting a rotary movement to said shaft, an arm keyed to said shaft, an arm loosely journaled on said shaft above the said first-mentioned shaft, a spring operatively connecting the said arms, a carriage arranged on said loosely-journaled arm, a plate arranged in said carriage so as to slide vertically therein, a roller journaled on said plate and arranged to enter the depressions in the said plate, bell-crank levers secured on said carriage at the sides of said plate, and engaging with said plate, fingers secured to said first-mentioned arm and arranged to come in contact with the said bell-crank levers so as to lift the said roller in the said carriage, a dial secured on the last-mentioned arm, a cover arranged over said dial, and an opening formed in said cover, and arranged to permit the inspection of a single character on the dial at one time.

14. In a speed-indicator a casing, a frame arranged in said casing, vertical rods, plates mounted on the upper and lower ends of said rods, cups formed on said plates, cones secured in the upper and lower ends of said frame and extending into said cups, ball-bearings arranged in the respective cups, a sliding journal-box mounted on said rods, ball-bearings arranged in said journal-box, bell-crank levers supported at the upper end of the said rods, weights secured to the lower end of the bell-crank levers, links connecting the upper end of the bell-crank levers with the said sliding journal-box, a vertical shaft with its lower end journaled in said journal-box, a horizontal plate arranged in said casing above said vertical shaft, a vertical shaft journaled in said plate, and means for operatively connecting the first-mentioned shaft with the last-mentioned shaft so that the vertical movement of the first-mentioned shaft will cause a rotary movement of the last-mentioned shaft.

In testimony whereof I sign the foregoing specification, in the presence of two witnesses, this 1st day of October, 1902, at Cleveland, Ohio.

JAMES J. SLAVIN.

Witnesses:
VICTOR C. LYNCH,
G. M. HAYES.